US008322206B2

(12) United States Patent
Hucker et al.

(10) Patent No.: US 8,322,206 B2
(45) Date of Patent: Dec. 4, 2012

(54) APPARATUS AND METHOD FOR DETERMINING A FLUID FLOW STATE

(75) Inventors: Martyn John Hucker, Cleeve (GB); Clyde Warsop, Lydney (GB); Graham Andrew Johnson, Bristol (GB); David William Gough, Bristol (GB)

(73) Assignee: Bae Systems PLC, London (GB)

( * ) Notice: Subject to any disclaimer, the term of this patent is extended or adjusted under 35 U.S.C. 154(b) by 1057 days.

(21) Appl. No.: 12/300,564

(22) PCT Filed: Sep. 8, 2008

(86) PCT No.: PCT/GB2008/050799
§ 371 (c)(1),
(2), (4) Date: Nov. 12, 2008

(87) PCT Pub. No.: WO2009/034379
PCT Pub. Date: Mar. 19, 2009

(65) Prior Publication Data
US 2010/0170333 A1    Jul. 8, 2010

(30) Foreign Application Priority Data

Sep. 12, 2007   (EP) .................................... 07270049
Sep. 12, 2007   (GB) .................................... 0717774.4

(51) Int. Cl.
*G01M 9/00*     (2006.01)
*G01F 1/00*     (2006.01)
(52) U.S. Cl. ................. 73/147; 73/861; 73/196
(58) Field of Classification Search ........................ None
See application file for complete search history.

(56) References Cited

U.S. PATENT DOCUMENTS

| | | | |
|---|---|---|---|
| 3,844,161 A * | 10/1974 | Kay ................................ 73/37.5 |
| 4,188,823 A | 2/1980 | Hood |
| 4,727,751 A | 3/1988 | Holmes et al. |
| 4,936,146 A | 6/1990 | Stack et al. |
| 5,272,915 A | 12/1993 | Gelbach et al. |
| 5,332,005 A * | 7/1994 | Baan ................................ 138/43 |
| 5,337,603 A * | 8/1994 | McFarland et al. ............. 73/202 |
| 5,837,903 A * | 11/1998 | Weigand .................... 73/861.42 |
| 6,308,553 B1 * | 10/2001 | Bonne et al. ................... 73/1.35 |

(Continued)

FOREIGN PATENT DOCUMENTS

DE    298 02 640 U1    7/1998

(Continued)

OTHER PUBLICATIONS

United Kingdom Search Report dated Dec. 21, 2007.

(Continued)

*Primary Examiner* — Lisa Caputo
*Assistant Examiner* — Jermaine Jenkins
(74) *Attorney, Agent, or Firm* — Buchanan Ingersoll & Rooney PC

(57) ABSTRACT

In order to discriminate between laminar flow and turbulent flow states, and to provide an indication, e.g. to a pilot of an aircraft of air flow over an aircraft wing, a sensor mounted on the wing provides an analogue signal of airflow, and an intermittency value of the analogue signal is derived in analogue circuitry including an AC coupling of the signal to an integrator for integrating the signal for a preset time. The integrated value is compared with a threshold value to indicate whether the intermittency represents quiet laminar flow or noisy turbulent flow.

20 Claims, 8 Drawing Sheets

U.S. PATENT DOCUMENTS

| | | | |
|---|---|---|---|
| 6,553,808 B2 * | 4/2003 | Bonne et al. | 73/24.01 |
| 6,715,339 B2 * | 4/2004 | Bonne et al. | 73/24.01 |
| 6,948,508 B2 * | 9/2005 | Shajii et al. | 137/1 |
| 7,178,409 B2 * | 2/2007 | Olin et al. | 73/861.52 |
| 7,454,984 B1 * | 11/2008 | Ross et al. | 73/861.52 |
| 7,568,383 B2 * | 8/2009 | Colvin et al. | 73/114.76 |

FOREIGN PATENT DOCUMENTS

| | | |
|---|---|---|
| WO | WO 2005/022089 A2 | 3/2005 |
| WO | WO 2007/034240 A2 | 3/2007 |

OTHER PUBLICATIONS

European Search Report dated Jan. 21, 2008.

Stephanie M. Los et al., "Statistical Analysis of In-Flight Hot-Film Signals of Transitional Flows", 29th AIAA Fluid Dynamics Conference, Jun. 15-18, 1998, pp. 1-17, XP-009094267, Albuquerque, NM.

Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/GB2008/050799 dated Mar. 25, 2010.

Notification of Transmittal of the International Search Report and the Written Opinion of the International Searching Authority Forms (PCT/ISA/220, PCT/ISA/210 and PCT/ISA/237) issued in corresponding International Application No. PCT/GB2008/050799 dated Apr. 7, 2009.

* cited by examiner

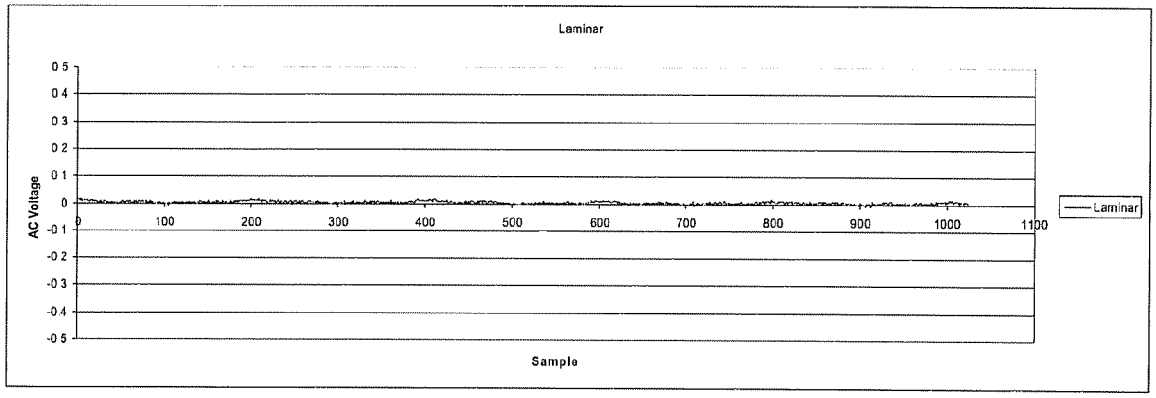
FIGURE 1 Laminar flow signal output
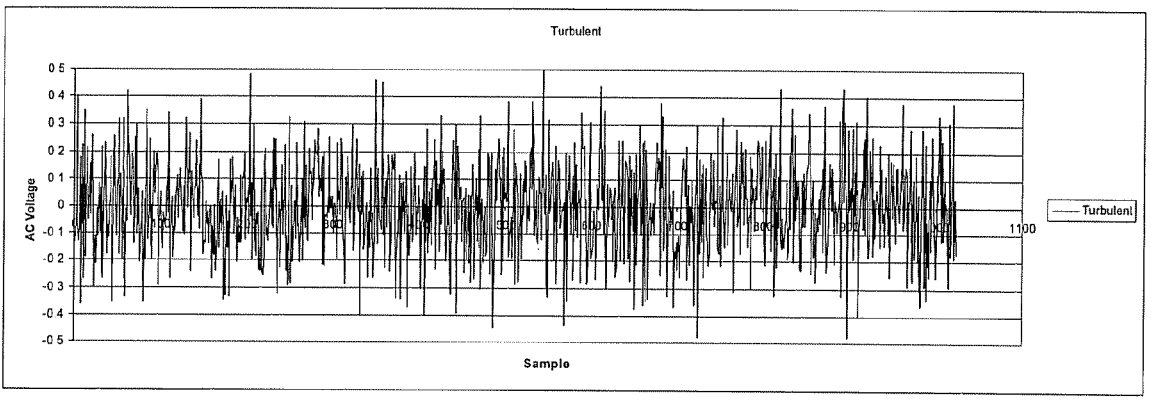
FIGURE 2 Turbulent flow signal output
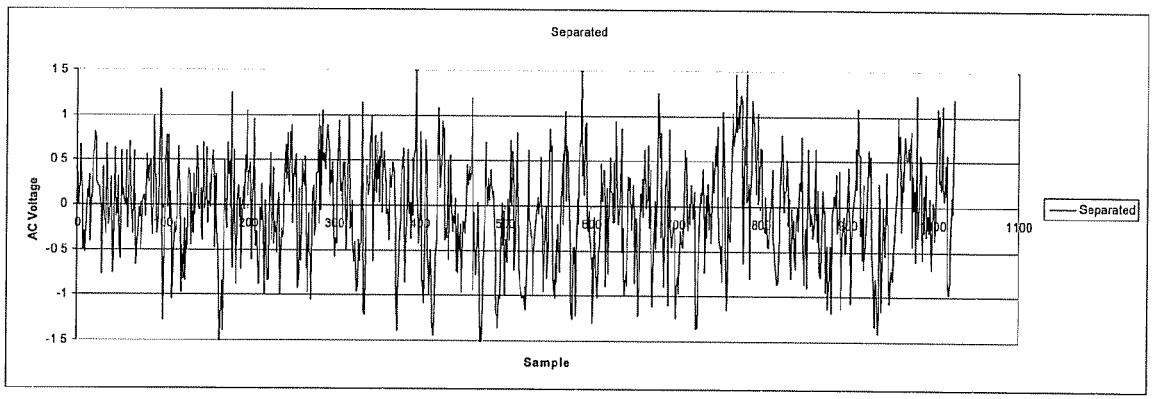
FIGURE 3 Sensor output for separated flow (Note amplitude is much larger than turbulent case)

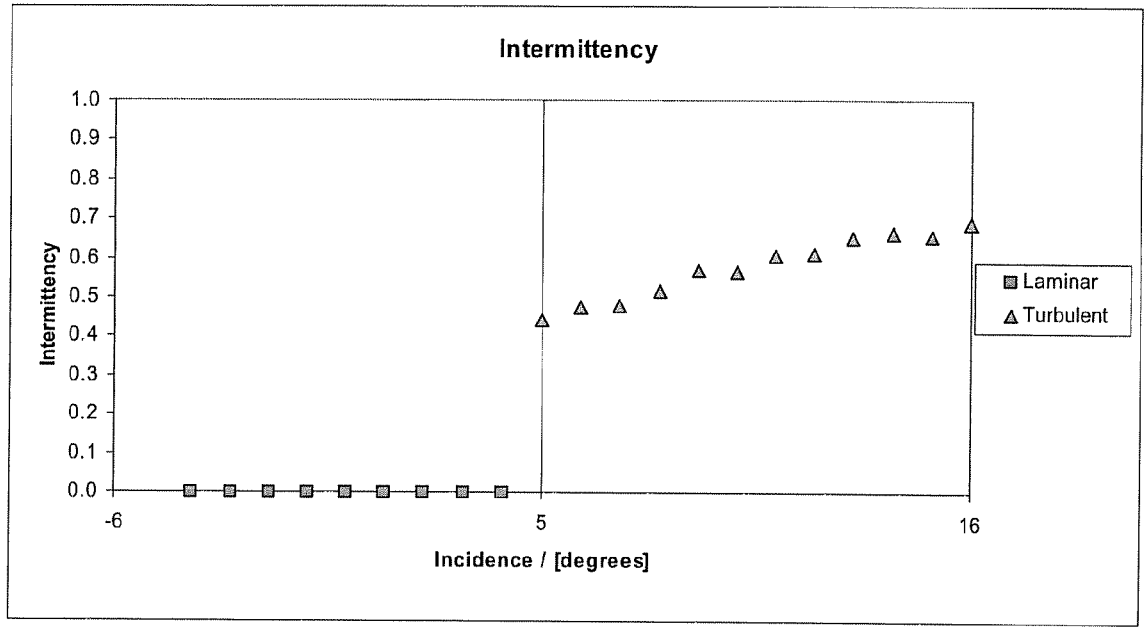
FIGURE 4 Intermittency with change in incident angle and flow state. Note large step up at transition.
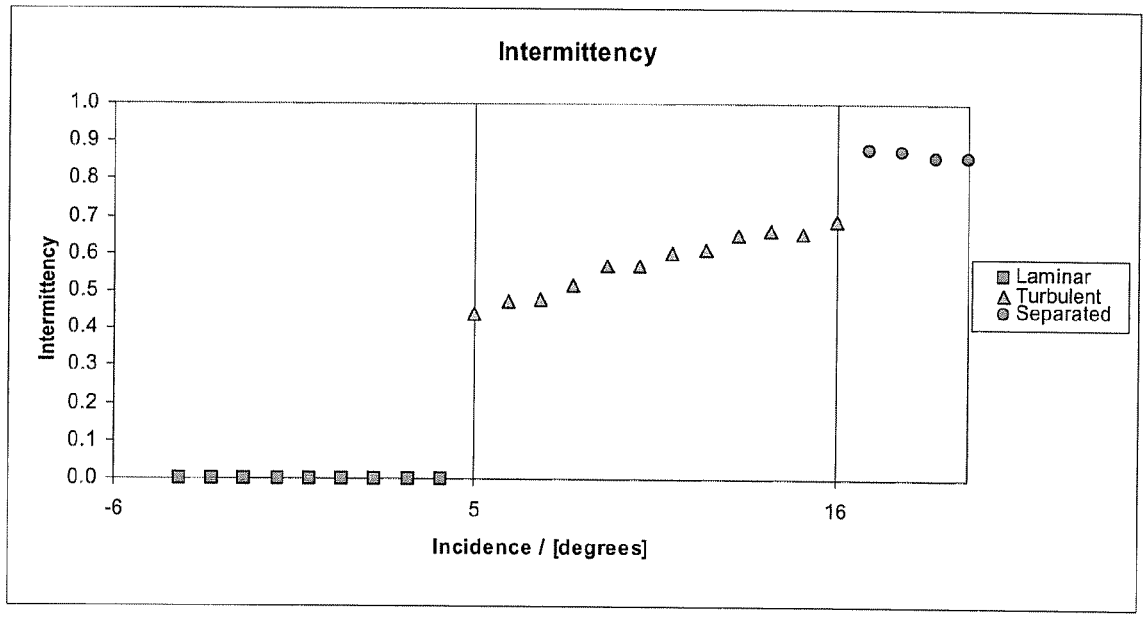
FIGURE 5 Intermittency with changing angle of attack showing abrupt changes between laminar-turbulent and separated flows.

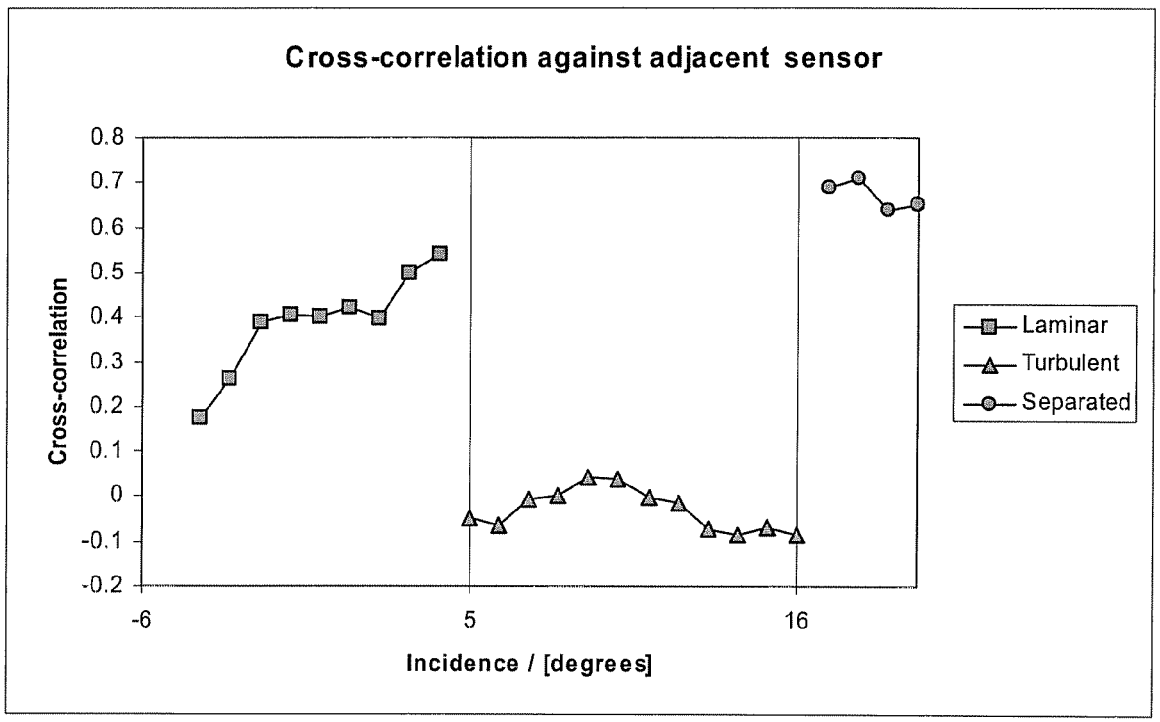
FIGURE 6 Cross correlation between two adjacent sensors
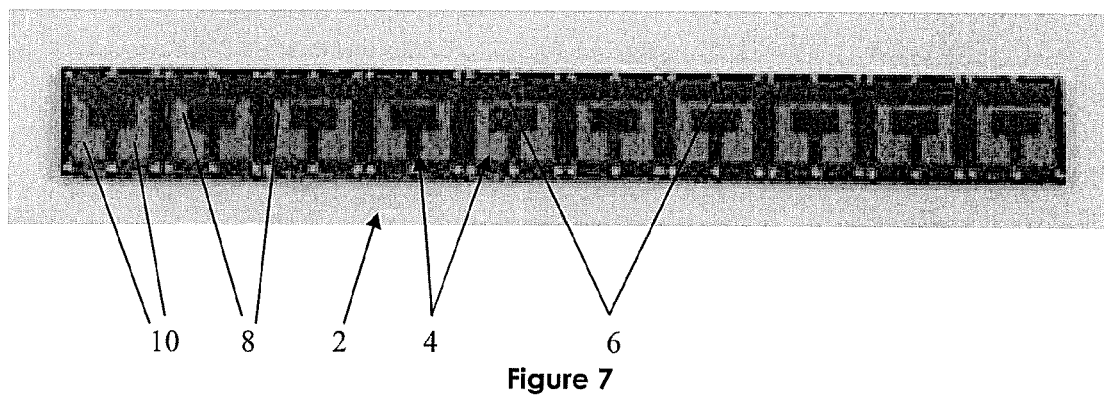
Figure 7

APPARATUS AND METHOD FOR DETERMINING A FLUID FLOW STATE

FIELD OF THE INVENTION

The present invention relates to method and apparatus for monitoring fluid flow, particularly though not exclusively air flow over an aircraft wing surface.

BACKGROUND ART

Anemometry devices for measuring wind speed by exposure of an electrically heated element to air flow are known. For example devices have been used in wind tunnels comprising a wire suspended between upstanding terminals. The wire is electrically energised and is mounted in an electronic circuit which maintains the wire at a constant current or a constant temperature/resistance. The circuit monitors consequent changes of voltage across the wire brought about by variations in the convective heat transfer rate as the speed of the flow under observation changes. It has been recently proposed in WO2007/034240 to provide an anemometry device of a construction which is suitable for use with in-service aircraft, for boundary layer control of air flowing over an aircraft wing. Airflow over an aircraft wing is simply characterised by three flow states, namely laminar flow, which is usually desired, which breaks into turbulent flow above certain angles of incidence, and separated flow, which occurs as a transition from turbulent flow for still greater angles of incidence. In practice the situation is more complex, and flow transitions may occur for other reasons such as changing air speed or external disturbances, and different states may exist over different areas of the wing. In addition, there is a further minor flow state, named the transitional state, between laminar and turbulent flow, but its properties are not precisely defined.

There remains the need for an inexpensive means of providing information, from the signal outputs of such anemometry devices, of the state of fluid flow over the anemometry device.

SUMMARY OF THE INVENTION

It is an object of the invention to provide method and apparatus for distinguishing between laminar flow and other flow states, principally turbulent flow, in the situation where fluid flows over a surface.

It has been established that there is a qualitative, or characteristic, difference in signal output from an anemometry device depending on whether fluid flow over the device is laminar, turbulent or separated. For laminar fluid flow, the signal output tends to be roughly constant with little short term variation. For turbulent and separated flow however, due to the presence of small or microscopic disturbances in the fluid flow, the sensor output is very variable, containing high frequency variations and many small impulses or spikes. It has been found that it is possible to determine, with an appropriate statistical measure of the signal output, whether the output is sufficiently variable, oscillatory or impulsive to represent turbulent or separated flow.

An appropriate statistical measure is that known as "intermittency", which may be regarded, for the purposes of the present specification, as the quality of being intermittent; that is occurring at intervals, but subject to interruption and cessation for periods of time. This derived signal parameter has suitable characteristics, since the underlying physical phenomenon is that turbulent and separated flow is intermittent with high levels of turbulence (containing unsteady disturbances) interspersed with relatively quieter periods. However laminar flow is generally quiet all the time, and therefore may be distinguished. Further in certain circumstances the intermittency value for separated flow may be characteristically higher than the intermittency value for turbulent flow, resulting in a large and well-defined step at the onset of separated flow, and this may therefore be used as an indicator for distinguishing between turbulent and separated flow.

It has also been established that where a plurality of sensors are provided adjacent or close to one another in an array, then a further useful measure to distinguish between types of flow is that of cross-correlation between the outputs of neighbouring sensors. Both laminar and separated flows are characterised by large scale coherent flow structures and so adjacent sensors will, broadly speaking, see similar behaviour, and therefore a high correlation will exist. For turbulent flow however, characterised by small-scale variations, there will be a low correlation. There may be a degree of phase difference between adjacent or near neighbour sensors (due to spanwise flow for example) so inspection over a short period is needed to capture this.

A simple truth table may be constructed to summarise this behaviour, LOW indicates the signal is below a threshold value, HIGH indicated the signal is above the threshold value. (V) HIGH indicates the intermittency is above a second threshold level if this is well defined.

| Intermittency | Cross-correlation | State |
|---|---|---|
| LOW | HIGH | LAMINAR |
| HIGH | LOW | TURBULENT |
| HIGH | HIGH | SEPARATED |
| (V)HIGH | n/a | SEPARATED |

Thus an assessment of intermittency may serve to distinguish laminar flow from turbulent flow, and in addition, in appropriate circumstances, separated flow.

In addition it has been discovered that particularly for separated flow, the sensor output signal is frequency sensitive, perhaps exhibiting resonance at certain frequencies, and in particular having cross-correlation values which may be stronger in one or more frequency bands. This may therefore give an alternative or additional measure of flow. Therefore it may be desirable to split the sensor output signals into a number of frequency bands, and to correlate respective signals in the same frequency band.

Accordingly the present invention provides in a first aspect, a method of discriminating between laminar flow and other flow states of a fluid at a predetermined location, comprising producing an electrical analogue signal representative of flow rate at said location, assessing variability of said analogue signal, including detecting a designated parameter of said analogue signal to provide a detected version thereof, and summing over time said detected version to provide a summed version, and providing a flow signal indicating whether the flow is laminar in dependence upon the value of said summed version.

In a further aspect, the invention provides apparatus for discriminating between laminar flow and other flow states of a fluid at a predetermined location, comprising sensing means responsive to flow rate at said location for producing an electrical analogue signal representative thereof, means for assessing variability of said analogue signal, including detection means for detecting a designated parameter of variability to provide a detected version of said analogue signal, and summing means for summing over time said detected version of the signal to provide an output value representing variability, and means for providing a flow signal indicating whether the flow is laminar in dependence upon said output value.

Whilst the invention has particular application to detection of flow state over an aircraft wing, it may be used in other applications, for example on turbine blades for vehicles or industrial processes, or in any industrial process where laminar flow is required over a surface. A particular advantage of the invention is that said flow signal may have just two values (single bit), i.e. laminar flow is or is not present, so that this information may be instantly recognisable, e.g. to a pilot of an aircraft, an operator assessing operation of turbine fan blades, a wind tunnel operator or other industrial processes involving fluid flow. However in some circumstances it may be desirable to provide a multi-level indication, representing a degree of confidence that the output represents laminar flow or turbulence.

The device for sensing fluid flow may take any form, e.g. anemometer circuits with hot wires of films, sensors as described in WO2007/034240, microphones, or pressure transducers. An appropriate circuit is provided for giving an analogue output signal. In the case of a hot film sensor, the circuitry may be arranged to keep the flow sensor resistor at a constant temperature, and comprises a bridge circuit, containing the flow sensor resistor in one arm. An output signal is derived from opposing nodes of the bridge, and is coupled via an operational amplifier circuit to an output port. The output signal is fed back to a third node of the bridge for energising the flow sensor resistor, to maintain a constant temperature of the resistor.

The analogue output signal may be fed to appropriate circuitry for assessing intermittency. As an initial stage, the signal is conditioned prior to signal analysis by appropriate signal conditioning circuitry. This may include low/high pass filters to limit response frequency range, and noise filters. Filters could be active or passive, but passive filtering is preferred for simplicity.

The filtered signal is supplied to a detection means, which may include mechanisms for detecting one or more of:—varying signals, peaks of impulsive signals, slope detection or a high pass filtering. As preferred, the detection means includes an AC coupling of the analogue signal (AC coupling gives an analogue output voltage that is proportional to the instantaneous rate of change of the input signal), for cutting out slowly varying signals that do not represent turbulence. This may be a straight forward capacitive coupling of a capacitor in the signal path, or a high pass RC filter, with a low value for pass frequency. In addition, rectification may be employed to prevent subsequent summing circuits being alternatively charged and discharged. As preferred for simplicity a mechanism for producing a half wave rectified or unipolar version of said analogue signal is preferred—this may require just a single diode in the signal path of the analogue signal.

Said summing means might comprise in some arrangements a shift register type mechanism for counting impulsive peaks detected by the detection means, and producing an output when a predetermined number are counted within a set time period. Alternatively and as preferred for simplicity, a simple RC integrating circuit is provided, with a suitable time constant so that an output of a predetermined level over a certain time period represents a turbulent condition. In a more accurate but complex arrangement, an integrator is clocked so as to integrate over a selected time period. At the end of the period a voltage appears at the output of the integrator which is related to the amount of noise on the signal for that period (the intermittency). A sample and hold circuit is clocked to sample the integrator output at the end of the selected time period. A thresholding circuit compares the output of the sample and hold circuit with one or more preset threshold voltages. Single threshold may be used for laminar/turbulent transition indication, multiple thresholds may be used to assign a degree of confidence in the output. The threshold output may trigger a variety of output signals such as: fixed output voltage level(s), characteristic frequencies or fixed currents for each confidence state.

In a practical preferred arrangement, an array of flow rate mechanisms, which may be anemometry devices, microphones, pressure transducers or other suitable devices are arranged in an array on the surface of an aircraft wing for example. Each flow rate mechanism has associated electrical circuitry to produce said output value representing intermittency. Said indication means may be associated with each flow rate mechanism; alternatively the indication means may be situated remote from the flow rate mechanisms, and may gather all the output values from the flow rate mechanisms, and rely on a voting mechanism etc, to produce an indication of whether the flow is laminar or turbulent. In a very simple form, the indicator means may comprise a light on the control panel of an aircraft, which is turned on in the case of turbulent flow.

BRIEF DESCRIPTION OF THE DRAWINGS

Preferred embodiments of the invention will now be described with reference to the accompanying drawings, wherein:

FIG. 1 is a graph of laminar flow as measured by a voltage output signal from an anemometry device over a time period of about 100 msec;

FIG. 2 is a graph of turbulent flow as measured by a voltage output signal from an anemometry device over a time period of about 100 msec;

FIG. 3 is a graph of separated flow as measured by a voltage output signal from an anemometry device over a time period of about 100 msec;

FIG. 4 is a graph showing intermittency measurement values for two states of flow: laminar and turbulent;

FIG. 5 is a graph showing intermittency measurement values for three states of flow: laminar, turbulent and separated;

FIG. 6 is a graph showing cross-correlation measurement values between two adjacent sensors for three states of flow: laminar, turbulent and separated;

FIG. 7 is a top plan view of a chip incorporating an array of several hot film flow sensors of the type described in WO2007/034240;

DESCRIPTION OF THE PREFERRED EMBODIMENTS

Figure 8:
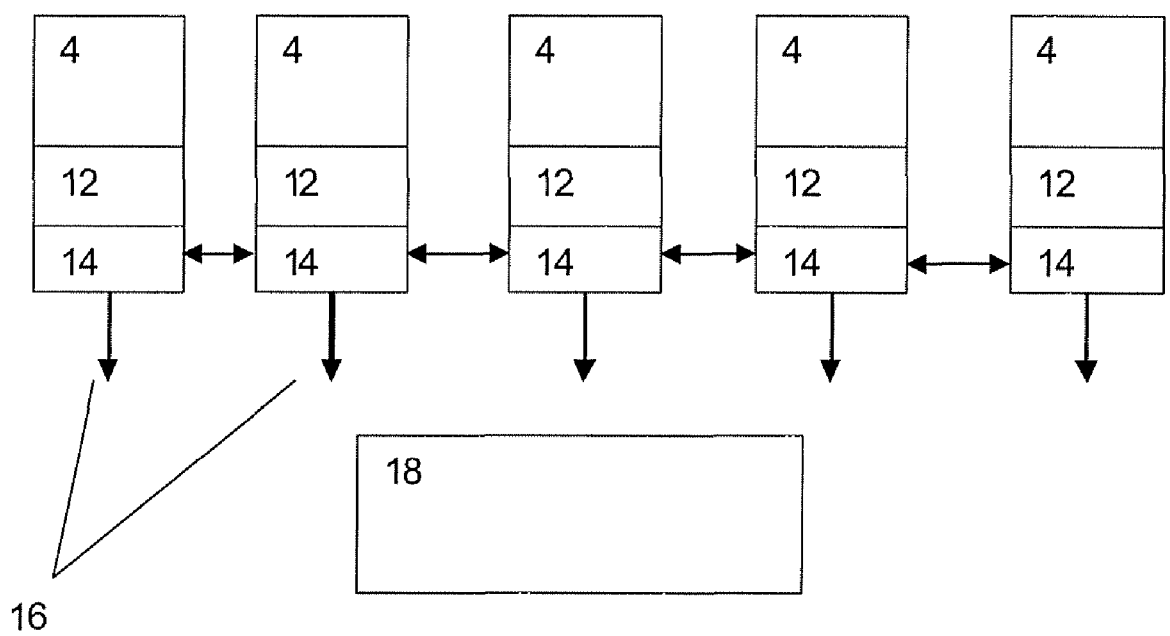
FIG. 8 is a schematic view of an array of hot film flow sensors of FIG. 7, each with respective associated circuitry.

This invention concerns the development of a device to provide a simple indication of the state of airflow, principally distinguishing between turbulent and laminar flow. In the preferred embodiment the device provides flow state monitoring at selected locations on an air vehicle but the device could also be used on other vehicles types and to monitor industrial processes.

Intermittency provides a good indication of flow state. The preferred embodiments use common circuit elements to perform operations directly on the analogue flow sensor signal. The proposed device is therefore simple, cheap and uncomplicated to implement. Tens or hundreds of such devices may be required in service so the savings may be considerable. Additionally the device could be fabricated on an integrated circuit as part of the MEMS sensor and so be made small enough to be mounted with the sensor directly at the point of measurement. This has many advantages in terms of systems stability and immunity from interference or signal degradation.

The functionality of the device could be extended to the detection of flow separation by dividing the input signals from adjacent sensors into several discrete frequency bands and comparing intermittency levels to provide a form of cross-correlation.

Referring to FIGS. 1 to 6, these are graphs taken from a measurement procedure, carried out on an array of hot flow film sensors as shown in FIG. 7. FIG. 7 shows an integrated circuit chip 2 incorporating several air flow hot film sensors 4, where air flow is measured by voltage change across the hot film. Each sensor comprises a hot film sense resistor 6 connected between vias 8, which are connected to conductive terminal pillars 10. The construction is described in more detail in WO2007/034240. The hot film is energised by an electrical circuit, described below, and the signal output from the sensor is in the form of an analogue voltage. The dimensions of the chip are 13500 µm long×1500 µm wide×250 µm thick. Thus the sensors are all located within a few is millimetres of each other.

The hot-film sensors were mounted on a leading-edge slat of a 2D high lift model in a wind tunnel and measurements taken at Mach 0.2 (68 m/s) giving a chord Reynolds number of ~3 million. The hot-film sampling frequency was 10 kHz, and a total of 1024 samples taken for each sensor, corresponding to just over 0.1 seconds. Data from hot-film sensors was collected, in the form of output voltages from each sensor. In FIGS. 1 to 3, the mean voltage values have been subtracted from all the data supplied, so only the fluctuating component has been analysed. The flow over the slat is such that at below 5° the flow is laminar over the hot-film sensors. Above 5° and below 16° the flow is turbulent, and above 16° the flow is separated. The transitional flow state has not been considered.

It may be seen for the case of laminar flow, shown in FIG. 1, the analogue output voltage is generally constant and not varying. The analogue output voltage for the case of turbulent flow, as shown in FIG. 2, is however extremely variable, resembling random noise. The analogue output voltage for the case of separated flow, as shown in FIG. 3, is generally similar to turbulent flow, but with signal amplitude much larger.

In accordance with the invention, the turbulent and separated flow voltage outputs have been analysed on the basis that flow is intermittent with high levels of turbulence interspersed with relatively quieter periods, but that laminar flow is essentially quiet all the time. Therefore, by filtering, smoothing and thresholding small time-slices of the signal so that the final result is either 0 (quiet) or 1 (noisy) and then calculating the proportion of time that the signal is noisy, a value called 'intermittency' can be calculated which varies between 0 and 1, with values close to zero being laminar, and values above zero but below 1 being turbulent.

It can be easily seen for FIG. 4, which plots intermittency value against angle of incidence of the leading-edge slat, that there is a step jump at an angle of 5°, where laminar flow changes to turbulent flow. Thus intermittency provides a clear-cut way of differentiating between laminar and turbulent flow. There is also a fairly clear change in intermittency values between turbulent and separated flows, as shown in FIG. 5, where a step jump in intermittency value occurs at an angle of 16°.

The advantage of using Intermittency rather than other measures such as standard deviation is that the critical values of Intermittency are not likely to change very much with changes in flow condition or noise, or sensor location. That is, for example it will probably always be the case that Intermittency will be less than 0.1 for laminar flow. It was also found, although not shown here that the choice of threshold value in the calculation of Intermittency was not particularly critical (variations of the value by a factor of 2 only made small differences), so any algorithm constructed in this way is likely to be very robust.

Another measure which is employed in accordance with the invention, is that of cross-correlation between neighbouring sensors, of an array of sensors. This is indicated graphically in FIG. 6, for two adjacent sensors of the array of FIG. 7. It will be noted that that for turbulent flow, the cross-correlation is low, reflecting very small local disturbances in air flow, whereas for laminar and separated flow, which are characterised by more large scale flow states, the correlation is high. Thus a means is provided for distinguishing turbulent flow from the other two flow states.

Referring now to FIG. 8, this shows a schematic representation of part of the array of FIG. 7 wherein the flow sensors 4 are coupled to respective constant temperature bridge circuits 12, which provide an analogue output voltage representing flow, to respective intermittency analysis circuits 14. The outputs 16 of the analysis circuits are supplied to an indicator circuit 18, which provides an indication of whether the flow is in general laminar, turbulent or separated.

Figure 9:
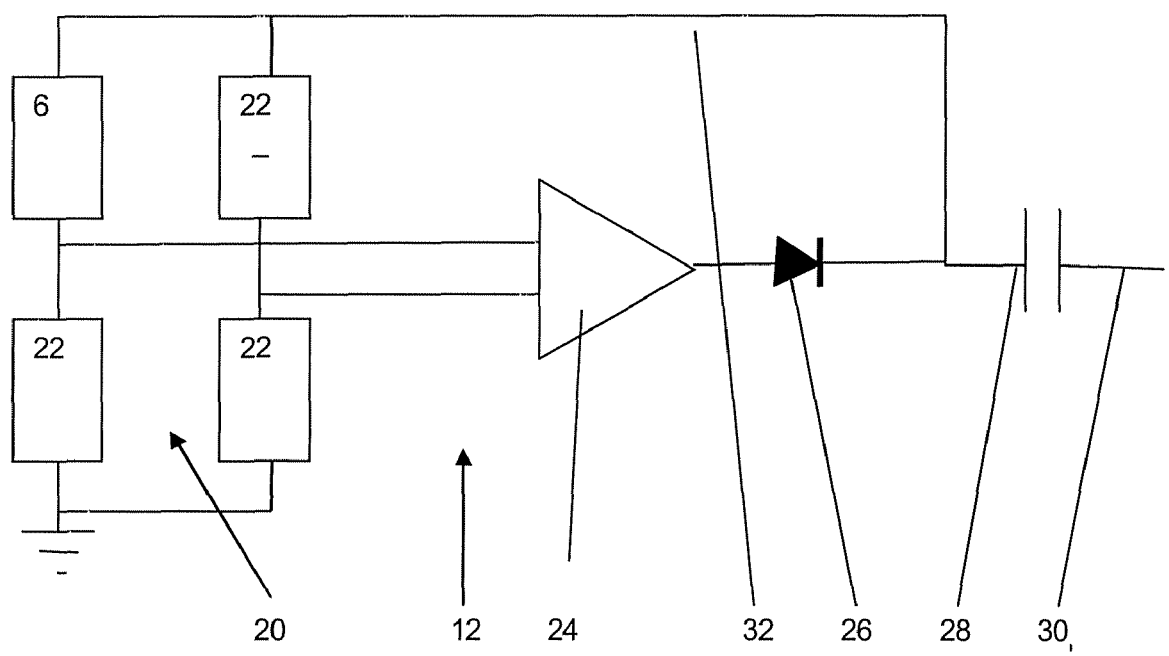
FIG. 9 is a circuit diagram of a constant temperature bridge circuit for providing an analogue voltage output from a single sensor device of FIG. 7.

An example of a constant temperature bridge circuit 12 is shown in FIG. 9. Sense resistor 6 is connected in one arm of a bridge circuit 20, which comprises fixed resistors 22 in the other three arms. An output taken from opposing nodes of the bridge circuit, is supplied to the input of an operational amplifier 24. The output of the amplifier 24 is fed via a diode 26 and an AC coupling capacitor 28, to a circuit output 30. A feedback path 32 from the diode 26 (the diode serving to stabilise the circuit) energises the bridge circuit 20, and sense resistor 6. The arrangement is such that when sense resistor 6 is exposed to airflow, and therefore cools, the value of its resistance changes by reason of the temperature coefficient of resistance. This creates a change in the output signal from the bridge circuit. The consequential output from amplifier 24 is fed back via path 32 to adjust the current supplied to the bridge 20, and hence maintain the resistor at a constant temperature.

Figure 10:
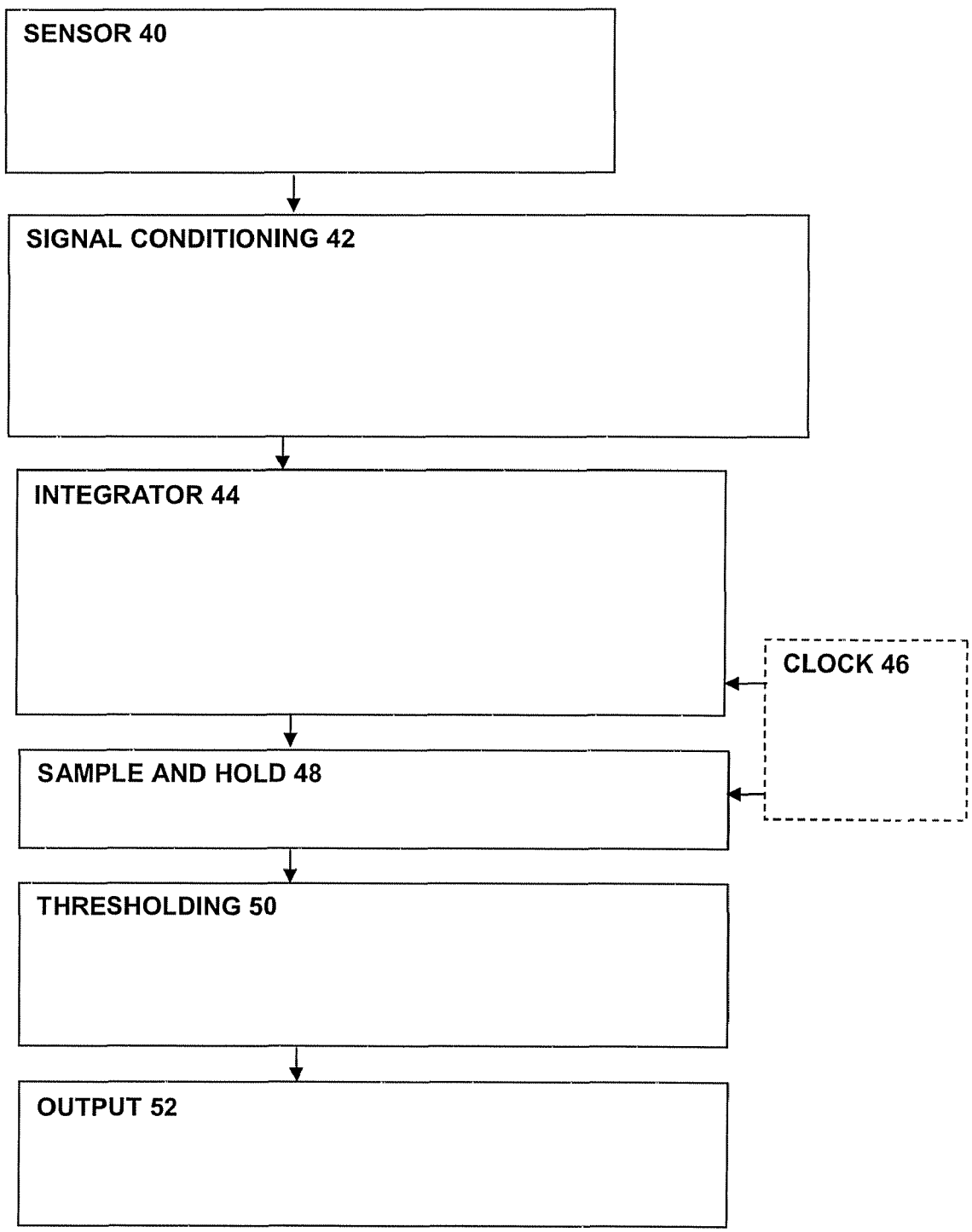
FIG. 10 is a conceptual diagram of a more complex embodiment of the invention.

Referring now to FIG. 10, this shows in conceptual form a first embodiment of the invention.

Sensor 40

The preferred embodiment uses MEMS hot film sensor 4 driving a constant temperature anemometer (CTA) with a frequency response up to 20 kHz. The anemometer output is an analogue voltage signal which is related to transients in heat convection caused by small scale flow fluctuations in the flow boundary layer. This voltage can be calibrated to give an indication of the free stream velocity of the flow.

Signal Conditioning 42

A preferred embodiment includes a low pass filter which attenuates anything above the maximum response rate of the sensor/anemometer combination to reduce noise and disturbance from any high frequency oscillation of the anemometer circuitry. Other filters may be necessary depending on the application to limit the frequency range of the input signal. The filters could be of an active or passive nature and many common circuit elements exist for this purpose. The preferred embodiment would use simple resistor/capacitor networks for simplicity where this is possible. The filter output is fed through a capacitor to provide an AC coupled output, i.e. the output of the capacitor is nominally zero volts under steady conditions and under varying conditions a voltage appears across the capacitor that is proportional to the rate of change of the input signal. It may also be necessary to apply half wave rectification to the signal to prevent alternate charging and discharging of the integrator during signal polarity reversal. Rectification may be applied within the anemometer circuitry or in the signal conditioning circuitry. The elements 26 and 28 of the sense circuitry of FIG. 9 are employed for this purpose.

With relatively slow changes in the speed of the flow (such as those encountered during normal vehicle acceleration/deceleration) a very small voltage will appear across the capacitor. Likewise under laminar flow conditions the flow is nominally in a steady state and again a small voltage will be produced. A large amount of noise is generated across a wide range of frequencies under turbulent or separated conditions and this condition would result in a large increase in the output voltage across the capacitor.

Integrator 44

This comprises a simple op-amp circuit or functionally similar unit. The sample period chosen to suit application, sensor frequency response and desired update intervals. A preferred embodiment uses 10-1000 ms.

An AC coupled input is integrated over the selected time period. At the end of the period a voltage appears at the output of the integrator which is related to the amount of noise on the signal for that period (the intermittency). After the output is sampled the integrator is reset and the next cycle begins. To establish the degree of intermittency the output of the signal conditioning stage is fed to an integrating amplifier for a predetermined period. At the end of this period the output voltage is fed to a sample and hold (S&H) circuit to store this voltage and provide input for the threshold detection stage until the next integration period is complete. Integrating amplifiers are a common circuit element often built around an operational amplifier. The integrating period will be selected according to the particular system under inspection but is likely to be of the order 1-1000 ms. After this period has elapsed the integrator will generate an output voltage that is proportional to the sum of the inputs over the period. This in turn will allow an indication to be made of the amount of noise detected during this period.

Clock 46

An external clock may be required to synchronise the integrator and S&H stages, but in the preferred embodiment the two stages would be linked to provide this control.

Sample and Hold 48

Integrator output is sampled at end of period and is held until the end of the next period. A similar result could also be achieved by latching the threshold detection stage.

Thresholding 50

The S&H output voltage is fed to a threshold detection stage. This stage compares the voltage output with a predetermined voltage level(s) set according to the needs of the system. The reference voltage(s) are set so that the output of the threshold stage changes state when the integrator voltage exceeds these point(s) and provides an output signal comprising a simple (single bit) indication of flow state. The use of multiple steps could allow a 'level of confidence' to be assigned to the state indication if desired. The threshold detection circuit could be made to 'latch' i.e. maintain its state until it receives a voltage outside of the currently held range so that the complexity of the integration/S&H stages could be reduced and if possible remove the need for a S&H stage altogether. Many common circuit elements could be used for this purpose but could include resistive bridges, zener diodes, transistor/diode junction voltage drop, Schmitt triggers etc.

Threshold voltage(s) may be set according to application and may be derived from practical measurements. A single threshold may be used for laminar/turbulent transition indication, multiple thresholds may be used to assign a degree of confidence in the output.

Output 52

The output stage provides a signal or indication of flow state in a form suitable for the systems downstream of the device. Outputs may include fixed voltage/currents, characteristic frequencies etc.

Threshold output may trigger a variety of output signals such as: Fixed output voltage level(s), characteristic frequencies or fixed currents for each state. Nature of output signal can be tailored to application, downstream hardware, transmission network etc.

Figure 11:
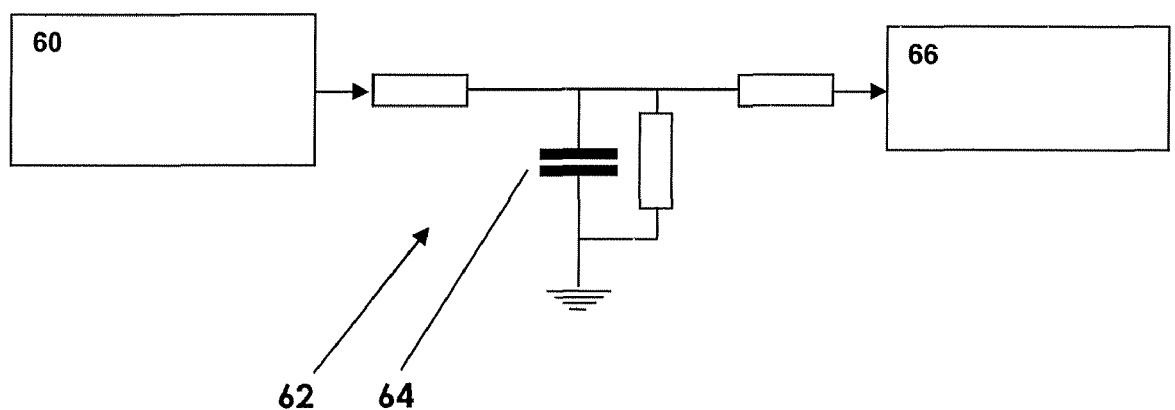
FIG. 11 is a circuit diagram of part of a preferred embodiment of the invention.

Referring now to FIG. 11, this shows a preferred embodiment, wherein the circuitry is made as simple as possible for cost reduction. A simple robust device that occupies very little space is desirable for airborne applications. A highly simplified but functionally equivalent circuit is desirable as a reduced component count will reduce the overall size and mass of each device. This would be especially important if 10s or 100s of devices are desired.

Sensor and Signal Conditioning Stages 60

The same as those described for the version of the device in FIG. 10.

Integrator 62

For the simple embodiment the half wave rectified, AC coupled output of the signal conditioning stage is passed through a simple series/parallel resistor capacitor network 64. This would give a continuously integrated output. The integration period is set by selecting the appropriate values for the resistors and capacitor to give the desired time constant (charging and discharging rates). This circuitry does not require additional external clock or S&H stages.

Threshold Detection 66

The simple version of the device would use similar techniques to those already described with reference to FIG. 10.

Figure 12:
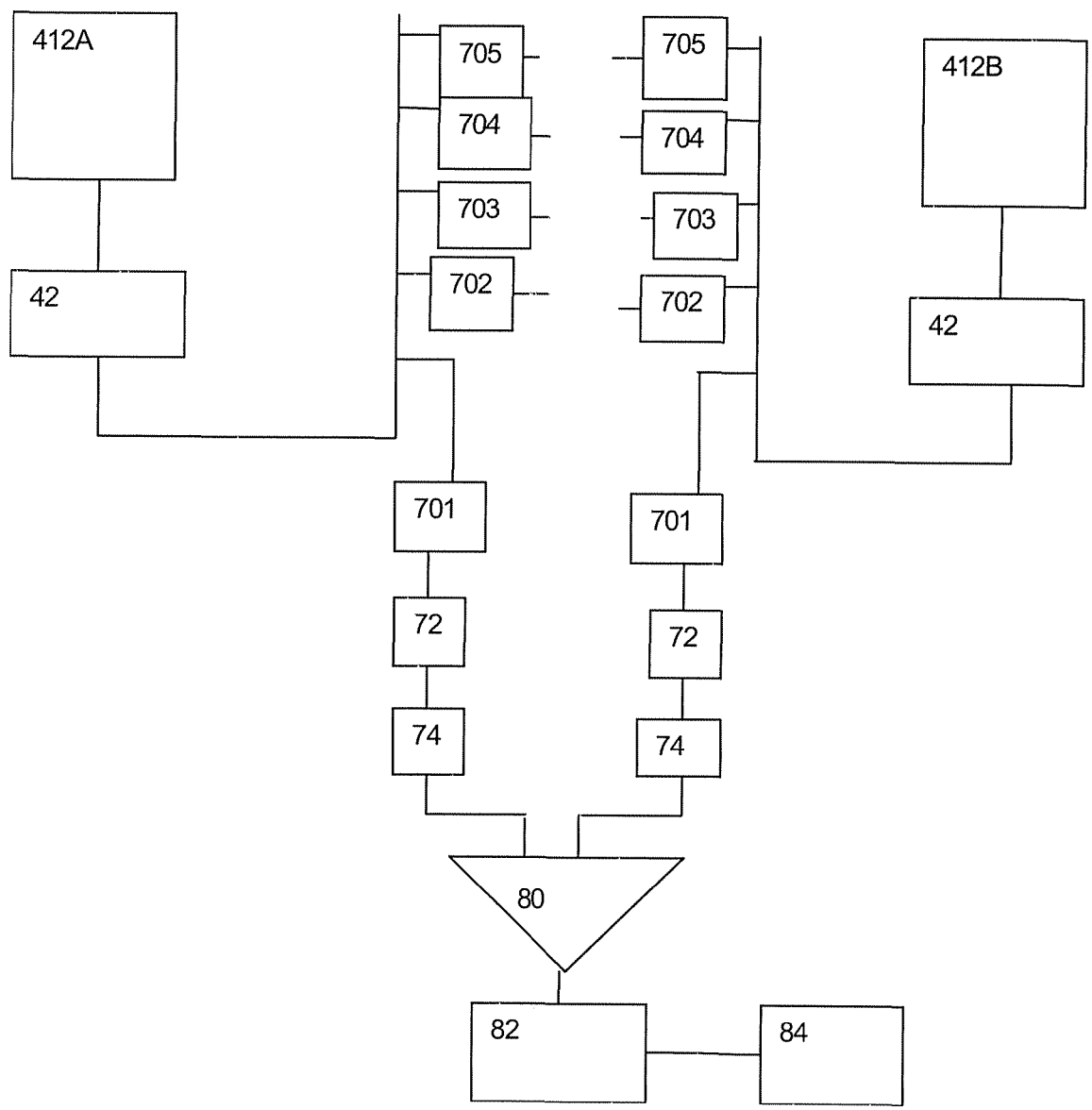
FIG. 12 is a conceptual diagram of an arrangement in accordance with the invention, employing techniques of cross-correlation.

Referring now to FIG. 12, this shows an arrangement, employing techniques of cross-correlation to distinguish between states of flow. Two adjacent sensors from the array of FIGS. 7 and 8, together with associated bridge circuits, 412A and 412B are each coupled to a respective signal conditioning circuit 42, which is similar to circuit 42 of FIG. 10. Each circuit 42 is then fed to a bank of passband filters 701-705, each having a frequency band, such that in this illustrative example, the signal bandwidth of 20 KHz is divided into five equal bands. The output from each passband filter is fed to a circuit 72, which has an AC coupling and halfwave rectification function, to an integrating circuit 74, which may be similar to that shown in FIG. 11. The outputs from circuits 74 (representing intermittency values of the signals) are compared in a comparator 80, and the difference output value is applied to a threshold circuit 82, which may be similar to circuit 50 of FIG. 10, and which provides a single bit flow signal indicating whether there is correlation or not, i.e. separation or not. An output circuit 84 is provided for providing a flow output signal to a remote indicator device.

Similar circuits are provided to process the outputs of the other passband filters, so that, in this embodiment, five different indicators are provided of correlation. These may be combined to provide an increased level of confidence in a transition from turbulent to separated flow.

In addition some frequency bands may have an enhanced sensitivity to the transition, and these may be weighted more heavily in the combination with other frequency bands. Further similar comparisons may be generated with pairs of sensors which are next-nearest neighbour, etc., in the case a more extensive correlation may be desired.

The circuit indicated in FIG. 12 for establishing correlation is designed to be simple, so as to reduce cost and size of integration. However, the complexity may be increased as desired, where a more accurate estimate of correlation is desired. For example the envelopes of the output signals over predetermined time intervals may be compared. Other mechanisms for establishing cross-correlation will be apparent to those skilled in the art. Further the more complex measures indicated in the description with reference to FIG. 10 may be employed to replace the rectification and integration steps above to provide a more accurate measure of intermittency.

The invention claimed is:

1. A method of discriminating between a laminar flow state and other types of flow states of a fluid at a predetermined location, comprising:
producing an electrical analogue signal representative of flow rate at said location;
assessing variability of said analogue signal, including detecting a designated parameter of said analogue signal to provide a detected version thereof, and summing over time said detected version to provide a summed version; and
determining the type of flow state based upon the value of said summed version.

2. The method according to claim 1, wherein said assessing comprises assessing the intermittency of said analogue signal.

3. The method according to claim 2, wherein said detecting includes detecting the rate of change of said analogue signal, and said summing comprises integrating said detected version.

4. The method according to claim 1, wherein said detecting includes detecting the rate of change of said analogue signal, and said summing comprises integrating said detected version.

5. An apparatus for discriminating between a laminar flow state and other types of flow states of a fluid at a predetermined location, comprising:
sensing means responsive to flow rate at said location for producing an electrical analogue signal representative thereof;
means for assessing variability of said analogue signal, including detection means for detecting a designated parameter of variability to provide a detected version of said analogue signal, and summing means for summing over time said detected version of the signal to provide an output value representing variability; and
means for determining the type of flow state based upon said output value.

6. The apparatus according to claim 5, wherein said assessing means comprises means for assessing the intermittency of said analogue signal, and said summing means provides an output signal representing intermittency.

7. The apparatus according to claim 6, wherein said sensing means comprises a heated resistance element exposed to fluid flow, and circuit means for maintaining the resistance element at a constant temperature.

8. The apparatus according to claim 5, wherein said sensing means comprises a heated resistance element exposed to fluid flow, and circuit means for maintaining the resistance element at a constant temperature.

9. The apparatus according to claim 8, wherein said detection means includes a capacitive AC coupling and/or a high pass filter for detecting the rate of change of said analogue signal.

10. The apparatus according to claim 5, wherein said detection means includes a capacitive AC coupling and/or a high pass filter for detecting the rate of change of said analogue signal.

11. The apparatus according to claim 10, wherein said detection means includes rectification means, preferably for half wave rectification.

12. The apparatus according to claim 5, wherein said detection means includes rectification means, preferably for half wave rectification.

13. The apparatus according to claim 12, wherein said summing means comprises a passive RC circuit providing an integration function with a predetermined time constant.

14. The apparatus according to claim 5, wherein said summing means comprises a passive RC circuit providing an integration function with a predetermined time constant.

15. The apparatus according to claim 5, wherein said summing means comprises an integrator circuit including an operational amplifier, and further comprising sample and hold means for sampling the output of the integrator circuit.

16. The apparatus according to claim 15, including clock means for synchronising operation of said integrator circuit and said sample and hold means.

17. The apparatus according to claim 5, including threshold means for determining whether said output value is above or below one or more threshold values.

18. The apparatus according to claim 5, wherein said sensing means, and said assessing means are integrated together on a single chip.

19. The apparatus according to claim 5, comprising a plurality of transducer means disposed in an array, and each arranged to provide a respective said output value representing variability.

20. The apparatus according to claim 5, including an indication means remote from said transducer means, and responsive to said flow signal.

* * * * *